D. A. SCHUTT.
GRAIN DRILL.
APPLICATION FILED JUNE 5, 1908.
917,162.
Patented Apr. 6, 1909.
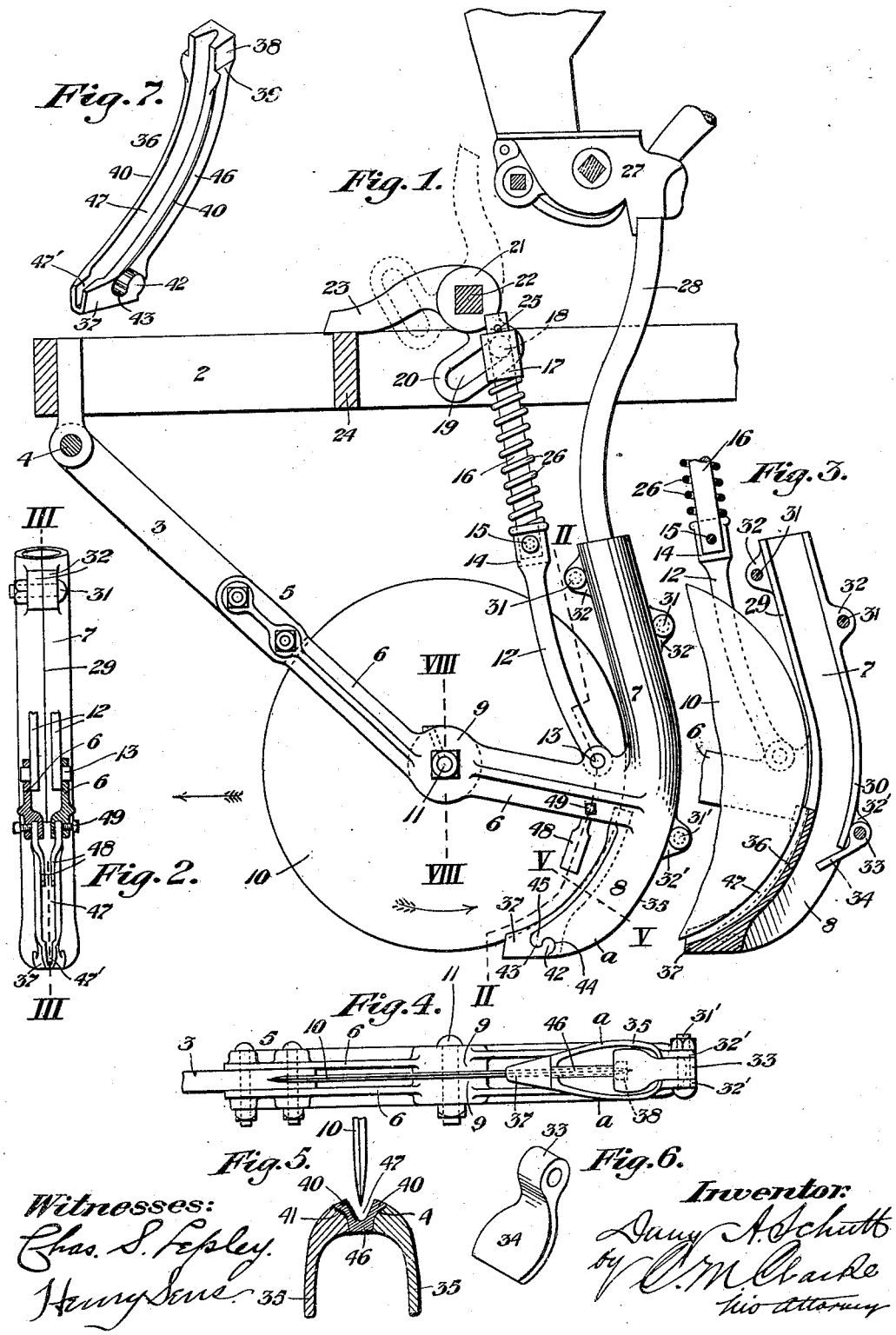
Witnesses:
Chas. S. Lepley.
Henry Sens.
Inventor:
Davy A. Schutt
by C. M. Clarke
his Attorney

UNITED STATES PATENT OFFICE.

DUNY A. SCHUTT, OF PERU, INDIANA.

GRAIN-DRILL.

No. 917,162.  Specification of Letters Patent.  Patented April 6, 1909.

Application filed June 5, 1908. Serial No. 436,801.

*To all whom it may concern:*

Be it known that I, DUNY A. SCHUTT, a citizen of the United States, residing at Peru, in the county of Miami and State of Indiana, have invented certain new and useful Improvements in Grain-Drills, of which the following is a specification, reference being had therein to the accompanying drawing.

My invention refers to improvements in disk grain drills for planting grain or seed and relates particularly to the disk hanger construction and its disk, and the manner in which these elements are constructed and operated.

The invention is an improvement in that class of implements shown and described in my former application filed June 27th, 1907 bearing the Serial Number 381,084.

Referring to the drawings: Figure 1 is a sectional elevation of a portion of a grain drill, showing the manner of mounting the hanger on the framework of a machine. Fig. 2 is a sectional elevation of the inner side of the seed conduit indicated by the section line II. II. of Fig. 1, the disk having been removed. Fig. 3 is a central vertical section of the conduit on the line III. III. of Fig. 2. Fig. 4 is an under plan view of the hanger, disk and frame of Fig. 1. Fig. 5 is a cross section on the line V. V. of Fig. 1. Fig. 6 is a perspective detail view of the adjustable grain-deflecting gate. Fig. 7 is a similar view of the removable point of the conduit.

The present improvement relates particularly to the disk hanger construction as a whole, adapted to be mounted on the main frame 2 of the machine by drag bar 3, said bar being pivoted at 4 in a suitable bearing and secured at 5 between the double side bars 6, 6, of the hanger frame. Said side bars 6 are integral with and extend forwardly of the half-round conduit sides which together form the conduit 7, of substantially cylindrical cross section or other suitable form at its upper portion, and terminating at its lower portion in the downwardly and forwardly extending plow-share terminals 8, 8. The side bars 6 are joined with said conduit side members between the upper conduit portion and the plow share portion 8 as shown, and are provided with bearings 9 in which the disk 10 is mounted on a bearing bolt 11 of any suitable construction, the bearing being provided with suitable lubricating channels.

The disk hanger is supported at front by the drag bar 3 and is also supported and raised or lowered by the divided arms 12, 12, pivotally connected with side bars 6 at 13. Arms 12 terminate at their upper ends in semi-cylindrical sockets 14 embracing and connected by pin 15 with the lower end of stem 16. Said stem is slidingly mounted in a block 17 having a stud or wrist pin 18 slidingly mounted in slot 19 of a raising and lowering arm 20 secured by its hub 21 on rock shaft 22 of the machine. The hub is also preferably provided with a rest arm 23 adapted to bear on cross bar 24 of the machine and is operable in the same manner generally as shown and described in my pending application above referred to, or in any other suitable manner.

The stem 16 is provided with a limiting pin or abutment 25 which restrains the downward travel of the disk hanger while permitting it to ride upwardly against the counteracting pressure of spring 26 upon encountering rocks, obstructions, etc. In normal operation the disk and hanger will be held downwardly into operative position with relation to the ground level, and may be raised to inoperative position by the rock shaft and arm 20, as indicated in dotted lines in Fig. 1.

27 is one of the seed cups of the machine, of any suitable construction, connected by flexible conduit 28 with the upper conduit portion 7 of the hanger, as will be readily understood.

The sides comprising the conduit portion 7 are brought together at their edges as indicated at 29 and 30 and are rigidly connected by screws or bolts 31 engaging lugs 32.

The lower pair of lugs 32' at the back of the conduit are separated as shown in Fig. 4 and between them is mounted by its hub 33 and bolt 31' the adjustable grain-deflecting gate 34. By loosening the bolt 31' the gate may be set at any desired angle across the conduit opening and permanently so held by tightening the bolt and firmly clamping the hub and the gate.

Immediately below the gate 34, which defines the lower termination of the closed upper portion of the conduit, the sides of the conduit are flared out into the form 11 shown at 35, extending downwardly and forwardly substantially parallel with each other and open for the full width at the rear to about the point $a$, from where they converge towards each other forwardly to their terminals, the opening at the back being correspondingly narrowed.

For the purpose of providing a removable entering point for the plow-share terminals of the conduit and a guiding housing for the disk 10, I insert between the sides 8 at their front portions, (which are rounded as shown in Fig. 5 similar to the front portions of the conduit sections 7) the segmental section 36 (Fig. 7) which constitutes a closing wall for the front of the plow share portions 8 and terminates in a tapering nose 27.

Section 36 extends upwardly and backwardly from its point or nose 37 between the front edges of portions 8 to a point substantially opposite the bolt 31' and is provided with an upper terminal shoulder 38 embraced between the adjacent edges of the conduit and is provided with under shoulders 39 fitting into suitable receiving sockets in the conduit edges. The front of said section is curved to correspond to the arc of curvature of the conduit and disk and is widened by means of bearing wings 40 fitting into receiving segmental recesses 41 at each side, which extend for substantially the full length of the share portions 8.

The point 37 is provided at each side with interlocking lugs and sockets 42, 43, engaging corresponding sockets 44 and lugs 45 at each side of the front terminals of share portions 8, and the section 36 is also provided at its back with a central rib 46. Said rib 46 is of sufficient width to give a substantial body to the section and is embraced between the adjacent front edges of share portions 8 as shown, while the front of the point section 36 is grooved as indicated at 47 for clearance of the edge of the disk.

At the lower terminal of the section, backwardly from the upper front portion of point 37 the groove 47 is narrowed as at 47', somewhat wider than the edge of the disk 10 with sufficient clearance, but adapted to confine the disk against excessive lateral motion, while the wider groove 47 above, prevents any frictional engagement, thereby obviating any binding or undue wear on the disk or such adjacent parts.

48 represents scrapers mounted in side bars 6 at each side by lugs and set screws 49 and arranged to remove the surplus soil from the disk during its rotation.

The disk itself is preferably flat, having a sharpened periphery adapted to cut the grass and weeds and to make an initial incision in the soil in advance of point 37. Said point, advancing immediately in the rear of the disk, opens up the furrow by its backwardly diverging sides, and the sides 35 of the share portion provide an ample open furrow into which the grain is dropped immediately in the rear of the point.

It will be seen that by adjusting the gate 34 to any desired inclination the grain may be delivered as desired, and as the share advances the furrow will be closed by the falling of the earth behind it to cover the grain.

I have found in practice that the apparatus as a whole gives excellent results in any kinds of soil or soft mud, and will continue to operate without choking and will always provide a trench and cover the grain therein due to the divided backwardly diverging sides of the share.

By making the conduit and its parts in divisible halves and connecting them by the bolts as shown, it is comparatively easy to separate the halves to remove or insert the section 36 and it may be done without the necessity of any special skill. This is a particular and important feature of advantage in that the point section may be readily and quickly renewed when worn or broken, and by its construction it becomes rigidly incorporated with the conduit hanger, due to the clamping effect of the bolts and the interlocking engagement of the lugs and recesses 42, 43, 44, and 45.

When constructed and assembled in the manner shown, the device is capable of excellent results and continuous use without any particular attention; the separability of the conduit and its easy adjustment, avoiding the use of rivets or any fixed connections, provides a construction which can be operated and adjusted by any one; the facility for renewal of the point section, which is the element subject to the greatest wear, renders the device of great economic value and serviceability, while the mounting of the disk in its dust-proof bearings is a feature of advantage.

It will be understood that the invention may be changed or varied in construction, proportions or other details by the skilled mechanic and that its novel features may be embodied with other forms of hanger or disk, but all such changes are to be considered as within the scope of the following claims:

What I claim is:—

1. A disk hanger for grain drills provided with a conduit having a removable transversely continuous entering point provided with a shallow clearance groove, substantially as set forth.

2. A disk hanger for grain drills provided with a separable two-part conduit and a terminal entering point embraced thereby, substantially as set forth.

3. A disk hanger for grain drills provided with a separable two-part conduit terminating in lower divided share portions and having a terminal entering point held between said portions, substantially as set forth.

4. A disk hanger for grain drills provided with a separable two-part conduit and provided with a terminal entering point embraced thereby having a clearance groove for the disk, substantially as set forth.

5. A disk hanger for grain drills provided with a separable two-part conduit and provided with a terminal entering point embraced thereby having a clearance groove for the disk narrowed at its forward end, substantially as set forth.

6. A disk hanger for grain drills provided with a closed conduit at its upper portion and an open-back forwardly extending share terminal having a removable grooved entering point, substantially as set forth.

7. A disk hanger for grain drills provided with a closed conduit at its upper portion, an open-back forwardly extending ground-entering share terminal having a removable grooved entering point, and an adjustable grain-deflecting gate located between the rear sides of the open-back share terminal, substantially as set forth.

8. A disk hanger for grain drills provided with a closed conduit at its upper portion, a transversely continuous removable point portion having a disk groove, and an adjustable grain-deflecting gate, substantially as set forth.

9. In a disk hanger, the combination of separable sides comprising a conduit portion and a share portion, and an entering point held between the adjacent front edges of the share portion, substantially as set forth.

10. In a disk hanger, the combination of separable sides comprising a closed upper conduit portion, an open-back forwardly extending tapered share portion, and an entering point held between the adjacent front edges of the share portion, substantially as set forth.

11. In a disk hanger, the combination of separable sides comprising a conduit portion and a share portion, an entering point held between the adjacent front edges of the share portion, and an adjustable grain-deflecting gate adapted for location across the conduit area, substantially as set forth.

12. In a disk hanger, the combination of separable sides comprising a conduit portion and a share portion, an entering point held between the adjacent front edges of the share portion, said share portion and point having interlocking elements, and means for holding the sides together, substantially as set forth.

13. In a disk hanger, the combination of separable sides, comprising a conduit portion and a share portion, an entering point held between the adjacent front edges of the share portion, said share portion and point having interlocking elements, an adjustable grain-deflecting gate held between the sides, and means for holding the sides together, substantially as set forth.

14. In a disk hanger, the combination of separable arc-shaped sides comprising a conduit portion and a share portion, and provided with forwardly extending disk-bearing portions, substantially as set forth.

15. In a disk hanger, the combination of separable arc-shaped sides comprising a conduit portion and a share portion, and provided with forwardly extending disk-bearing portions having drag bar extensions, substantially as set forth.

16. The combination with the machine frame, of a separable two-part disk hanger pivotally mounted on the frame by a connecting drag bar and having a closed arc-shaped conduit terminating in a lower open-back tapered share portion, with an intervening grain-deflecting gate, substantially as set forth.

17. The combination with the machine frame, of a separable two-part disk hanger pivotally mounted on the frame by a connecting drag bar and having a closed arc-shaped conduit terminating in an open-back tapered share portion, an intervening grain-deflecting gate, and means for raising and lowering the hanger, substantially as set forth.

18. In a disk hanger, the combination with the disk, of disk embracing side bearing portions having rear arc-shaped conduit and share portions connected together, with an intervening point section, substantially as set forth.

19. In a disk hanger, the combination with the disk, of disk embracing side bearing portions having rear arc-shaped conduit and share portions connected together, with an interveing grooved point section, substantially as set forth.

20. In a disk hanger, the combination with the disk, of disk embracing side bearing portions having rear arc-shaped conduit and share portions connected together, with an intervening point section, and an adjustable grain-deflecting gate, substantially as set forth.

21. In a disk hanger, the combination with the disk, of disk embracing side bearing portions having rear arc-shaped conduit and share portions connected together, a removable entering point, and scraper blades mounted in said side bearing portions in operative relation to the disk, substantially as set forth.

22. In a disk hanger, the combination with the disk, of disk embracing side bearing portions having rear arc-shaped conduit and share portions connected together, a removable entering point, and lifting arms pivotally attached to said side bearing portions and adapted for connection with an actuating element, substantially as set forth.

23. The combination with a two-part arc-shaped conduit terminal, of a segmental point section having a front groove and incorporated between the sides of the conduit terminal, substantially as set forth.

24. The combination with a two-part arc-shaped conduit terminal, of a segmental point section having a front groove narrowed at its lower end and incorporated between the sides of the conduit terminal, substantially as set forth.

25. The combination with a two-part arc-shaped conduit having interlocking recesses and projections at its lower forward portion, of a segmental point section having a front groove and interlocking projections and recesses at each side interlocking with said holding elements of the conduit sides, substantially as set forth.

In testimony whereof I affix my signature in presence of two witnesses.

DUNY A. SCHUTT.

Witnesses:
BERTHA DALLMANN,
WM. B. McCLINTIC.